(12) United States Patent
Gagas

(10) Patent No.: US 7,703,474 B2
(45) Date of Patent: Apr. 27, 2010

(54) GATE VALVE SEALING STRUCTURE

(75) Inventor: Michael Gagas, Franklin, WI (US)

(73) Assignee: Adaptor, Inc., West Allis, WI (US)

( * ) Notice: Subject to any disclaimer, the term of this patent is extended or adjusted under 35 U.S.C. 154(b) by 1048 days.

(21) Appl. No.: 11/217,994

(22) Filed: Sep. 1, 2005

(65) Prior Publication Data

US 2007/0044841 A1 Mar. 1, 2007

(51) Int. Cl.
*F16L 5/00* (2006.01)
(52) U.S. Cl. .................. 137/367; 137/364; 137/365; 137/370; 285/332.1; 285/334.5
(58) Field of Classification Search ............... 137/364, 137/365, 367, 370, 375; 285/9.2, 304, 334.5, 285/334.4, 332.1
See application file for complete search history.

(56) References Cited

U.S. PATENT DOCUMENTS

| 221,526 | A | * | 11/1879 | Connolly | 137/367 |
|---|---|---|---|---|---|
| 307,558 | A | * | 11/1884 | Lindsley et al. | 137/367 |
| 349,567 | A | | 9/1886 | Clarke | |
| 380,308 | A | * | 4/1888 | Barry, Jr. | 137/370 |
| 514,633 | A | | 2/1894 | Sund | |
| 536,268 | A | | 3/1895 | Cullen | |
| 589,357 | A | | 8/1897 | Link | |
| 604,622 | A | | 5/1898 | Lobdell et al. | |
| 820,616 | A | | 5/1906 | Batt | |
| 852,359 | A | | 4/1907 | Walcott et al. | |
| 996,956 | A | * | 7/1911 | Walcott | 137/367 |
| 1,000,108 | A | * | 8/1911 | Mueller | 137/367 |
| 1,608,772 | A | | 11/1926 | Cole | |
| 1,987,502 | A | | 1/1935 | Born et al. | |
| 2,008,138 | A | | 7/1935 | Le Duc | |
| 2,059,085 | A | * | 10/1936 | Buck | 137/364 |
| 2,099,479 | A | | 11/1937 | Heinkel et al. | |
| 2,596,532 | A | | 5/1952 | Coolidge et al. | |
| 2,827,914 | A | * | 3/1958 | Alters | 137/364 |
| 3,308,727 | A | | 3/1967 | Hurt Jr. | |
| 3,537,471 | A | * | 11/1970 | Houle | 137/370 |
| 3,548,864 | A | | 12/1970 | Handley et al. | |
| 3,658,086 | A | | 4/1972 | Hart | |
| RE28,640 | E | * | 12/1975 | Sauriol | 52/19 |
| 4,029,425 | A | | 6/1977 | Pelsue | |
| 4,030,519 | A | | 6/1977 | Zinn | |
| 4,064,902 | A | * | 12/1977 | Swenson | 137/370 |
| RE29,532 | E | | 2/1978 | Zwick | |
| 4,188,151 | A | | 2/1980 | Hall | |
| 4,275,757 | A | | 6/1981 | Singer | |
| 4,305,679 | A | | 12/1981 | Modi | |

(Continued)

FOREIGN PATENT DOCUMENTS

GB 2 102 479 A 6/1982

*Primary Examiner*—John K Fristoe, Jr.
*Assistant Examiner*—Marina Tietjen
(74) *Attorney, Agent, or Firm*—Ryan Kromholz & Manion, S.C.

(57) ABSTRACT

An improved liquid infiltration adapting structure for preventing liquid infiltration around a gate valve box. The structure has an annular tube structure that is tapered to more easily receive a mating pipe. The tube structure may also comprise at least one bead for further securing the mating pipe. The adapting structure is also improved by providing a stepped inner flange for ease of installing the structure around the gate valve box.

17 Claims, 9 Drawing Sheets

U.S. PATENT DOCUMENTS

| | | | |
|---|---|---|---|
| 4,308,886 A | 1/1982 | Handley et al. | |
| 4,350,177 A | 9/1982 | Firchau et al. | |
| 4,368,893 A | 1/1983 | Gagas | |
| 4,440,407 A | 4/1984 | Gagas | |
| 4,449,715 A | 5/1984 | Gagas | |
| 4,469,467 A | 9/1984 | Odill et al. | |
| 4,475,845 A | 10/1984 | Odill et al. | |
| 4,534,378 A | 8/1985 | Gagas et al. | |
| 4,556,081 A | 12/1985 | Gagas | |
| 4,592,674 A | 6/1986 | Baliva | |
| 4,759,656 A | 7/1988 | Wilson | |
| 4,772,154 A | 9/1988 | Caroulle | |
| 4,819,687 A | 4/1989 | Alberico et al. | |
| 4,872,780 A | 10/1989 | Bowman | |
| 4,874,105 A * | 10/1989 | Tetreault | 220/484 |
| 4,905,725 A * | 3/1990 | Sinkinson et al. | 137/370 |
| 4,927,163 A | 5/1990 | Gagas | |
| 4,976,366 A * | 12/1990 | Russell | 220/4.21 |
| 5,095,667 A | 3/1992 | Ryan et al. | |
| 5,201,151 A | 4/1993 | LeBlanc et al. | |
| 5,240,345 A | 8/1993 | Gagas | |
| 5,299,884 A | 4/1994 | Westhoff et al. | |
| 5,316,040 A | 5/1994 | Townsend et al. | |
| 5,362,174 A | 11/1994 | Yang | |
| 5,394,898 A * | 3/1995 | Turner | 137/371 |
| 5,431,553 A | 7/1995 | Topf, Jr. | |
| 5,482,400 A | 1/1996 | Bavington | |
| 5,542,780 A | 8/1996 | Kourgli | |
| 5,628,152 A | 5/1997 | Bowman | |
| 5,722,204 A | 3/1998 | Stieb et al. | |
| 5,738,140 A * | 4/1998 | Mann | 137/369 |
| 5,775,365 A * | 7/1998 | Hayden et al. | 137/369 |
| 5,803,125 A * | 9/1998 | Bliss | 137/370 |
| 6,044,590 A * | 4/2000 | Gagas | 52/20 |
| 6,226,929 B1 * | 5/2001 | Gagas | 52/20 |
| 6,312,022 B1 * | 11/2001 | Brophy et al. | 285/268 |
| 6,354,325 B1 * | 3/2002 | Warnes et al. | 137/367 |
| 6,449,908 B2 * | 9/2002 | Gagas | 52/20 |
| 7,117,883 B1 * | 10/2006 | Vitalo | 137/366 |
| D577,106 S * | 9/2008 | Gagas | D23/248 |
| 2003/0230343 A1* | 12/2003 | Phipps | 137/364 |

* cited by examiner

GATE VALVE SEALING STRUCTURE

BACKGROUND OF THE INVENTION

The present invention is related to manhole and gate valve construction and, more specifically, to sealing structures for gate valves that prevent or substantially limit infiltration of liquids into the manhole or gate valve area.

Improvements have been made to gate valve sealing structures for added stability and improved sealing capabilities. Examples of such improvements can be seen in Gagas, U.S. Pat. Nos. 6,226,929 and 6,044,590 and Warnes, et al., U.S. Pat. No. 6,354,325. While these improvements have advanced the art, there is further room for improvement within the art.

The gate valve boxes that these sealing structures cooperate with generally are cast iron devices. Consequently, individual boxes may have imperfections that the sealing structures need to adapt to when being placed on the boxes. Sealing structures have been made out of flexible materials, such as rubber.

One disadvantage of currently made and designed sealing structures is a loss of tight sealing ability when providing a flexible structure. Because sealing structures are used in rigorous environments that do not provide a worker with much space when installing the sealing structures, such flexible structures can lead to deficient sealing arrangements.

Sealing structures have been designed with internal fingers or extensions that are used to center the sealing structure on a gate valve box. While effective for centering the sealing structure, such structures also leave room for improvement for complete sealing around the gate valve. Also, such structures do not assist in fitting a pipe, or properly acting as a pipefitter, to the sealing structure and gate valve box.

These structures and other prior art structures have a straight cylindrical arrangement that conforms to the size of the pipe. While the sealing structures are designed to tightly fit around or over the pipes, such a design also makes it hard to secure the pipe properly in place. The pressure or force between the pipe and the sealing structure increases as the pipe is mated with the structure, which leads to a difficult process for the installer and increases potential injury for the installer. It would be advantageous to have a sealing structure that would provide a tight sealing structure that would ease the installation process as related to current sealing structures.

SUMMARY OF THE INVENTION

The present invention is an improved liquid infiltration adapting structure for preventing liquid infiltration around manhole assemblies. Specifically, the present invention is an improved structure for mating and connecting a pipe member to a valve assembly. The structure has a generally annular tube structure having a top end and a bottom end and an inside surface and an outside surface, with one of the surfaces being arranged to receive the pipe member. The tube structure has been improved over the prior art by providing for the mating surface to taper evenly inwardly from the bottom end towards the top end of the tube, or outwardly from the top towards the bottom, depending upon the dimensions of the pipe member. This provides a tight seal, but also lessens the necessary pressure of properly securing the pipe to the adapting structure, thereby making the installation process easier. The tapered surface may also include a bead or a plurality of beads, which provides extra grip for holding the secured pipe in place.

The adapting structure of the present invention may also have an improved flange design over prior art flanges. The preferred flange of the adapting structure will taper inwardly from the tubular structure toward the center where the adapting structure will be fitted upon a valve assembly, with the taper either being of a stepped arrangement or of an even taper. The flange also may be slit or cut to allow additional flexibility for placing the adapting structure over the actual valve of the gate valve assembly. However, because the flange has a greater height at where the flange intersects the tubular structure than at where it interacts with the gate valve at an inner periphery, the adapting structure still is able to keep its shape when being situated over the gate valve assembly.

The adapting structure could further have an improved flange structure, whereby the flange comprises a flexible membrane for an improved sealing arrangement, or a secondary flange is attached to the adapting structure that consists of a flexible membrane.

Other features, such as openings in the annular tube for fitting the adapting structure to certain gate valves and additional flanges added to the adapting structure for stability, have also been incorporated into the present adapting structure.

These and other features of the invention will be clarified with the following drawings and description.

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structures. While the preferred embodiment has been described, the details may be changed without departing from the invention, which is defined by the claims.

Figure 1:
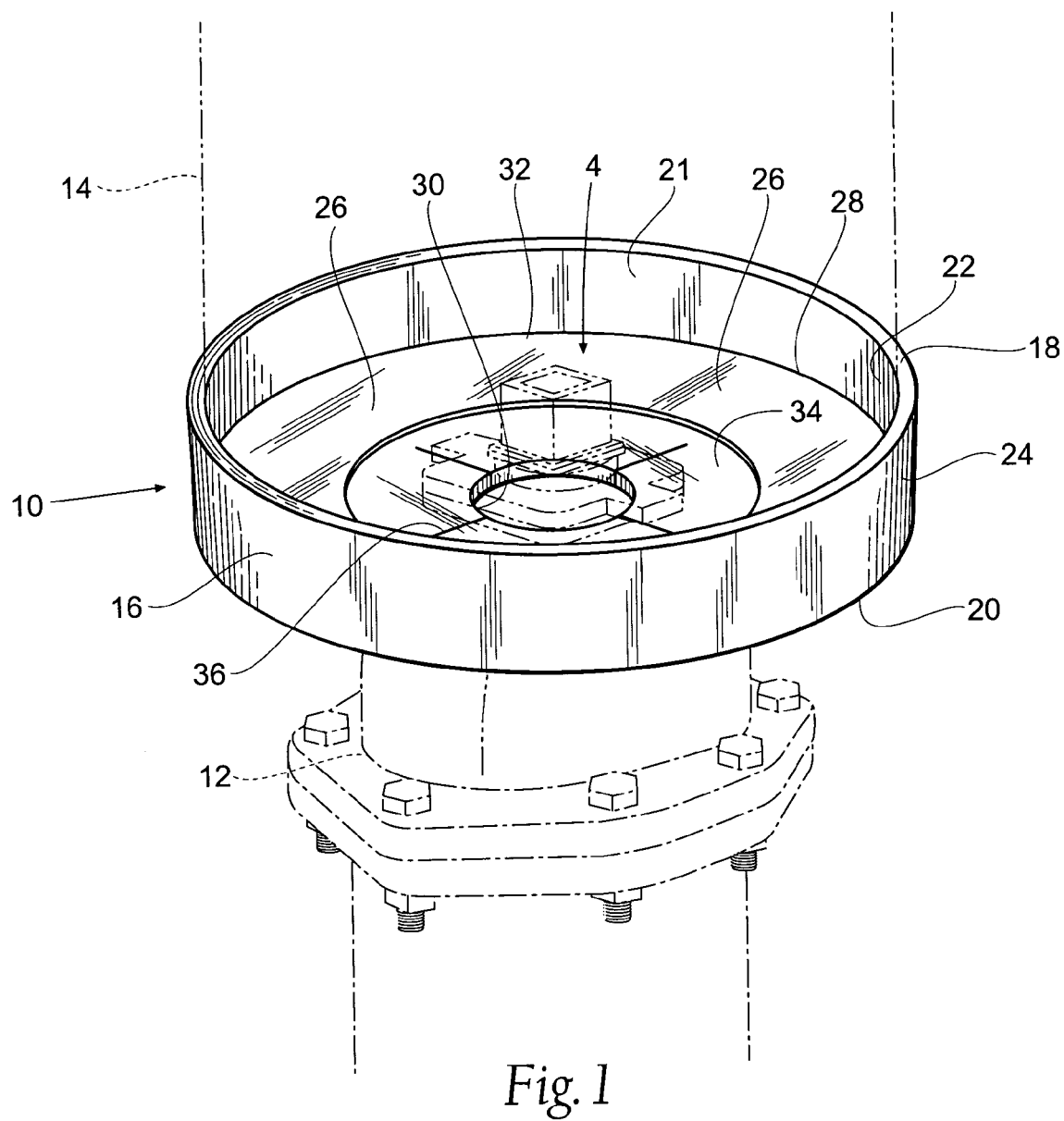
FIG. 1 is a perspective view of a first embodiment of a gate valve sealing structure according to the present invention.

FIG. 1 shows a perspective view of a liquid filtration adapting structure, which is also referred to as a gate valve sealing structure or adaptor 10. The adaptor 10 sits upon a gate valve 12 (shown in phantom) and allows a pipe member 14 (shown in phantom) to mate with and sealingly engage the gate valve 12 so that no liquid seeps into the area around the gate valve 12. The adaptor 10 comprises a generally annular tube structure 16 having a top end 18 and a bottom end 20 that generally defines a throughbore 4. The tube structure 16 also has an inside surface 22 and an outside surface 24. Depending on whether the pipe member 14 is arranged to fit over the tube structure 16 or inside of the tube structure 16, the respective outside surface 24 or the inside surface 22 will act as a mating surface for the pipe member 14. A flange 26 extends inwardly from the bottom end 20 of the inside surface 22 of the tube structure 16. The flange 26 has an outer periphery 28 located at the tube structure 16 and an inner periphery 30 located proximal to where the adaptor 10 sits on the gate valve 12. The inner periphery 30 forms one end of the throughbore 4. The inner periphery 30 is preferably concentrically arranged with respect to the outer periphery 28 and the gate valve 12 is centered with respect to the tube structure 16 and the inner periphery 30. As will be shown and understood from the following description and figures, the flange 26 may extend outwardly from the tube structure 16, or may be designed to extend both outwardly and inwardly with respect to the tube structure 16.

Still referring to FIG. 1, the flange 26 has an outer portion 32 and a stepped inner portion 34, with the outer portion 32 and the inner portion 34 preferably concentrically arranged. The inner portion 34 comprises a plurality of slits 36 that allow the flange 26 to flex around the gate valve 12, thereby providing a solid seal around the gate valve 12. Preferably, the slits 36 are arranged to divide the inner portion 34 into four quadrants. However, depending on the configuration of the gate valve and any protrusions located on the gated valve, there may be more or fewer slits 36 to provide the necessary flexibility. The adaptor 10 provides an efficient sealing structure that is easier to install than previous adaptors by allowing more flexibility and play for the installer, while still providing sufficient structural support. That is, the flexibility of the inner portion 34 allows the installer to more easily manipulate the adaptor 10 when placing the adaptor 10 over a conventional gate valve. However, the flange 26 design still provides for a tight sealing arrangement.

Figure 2:
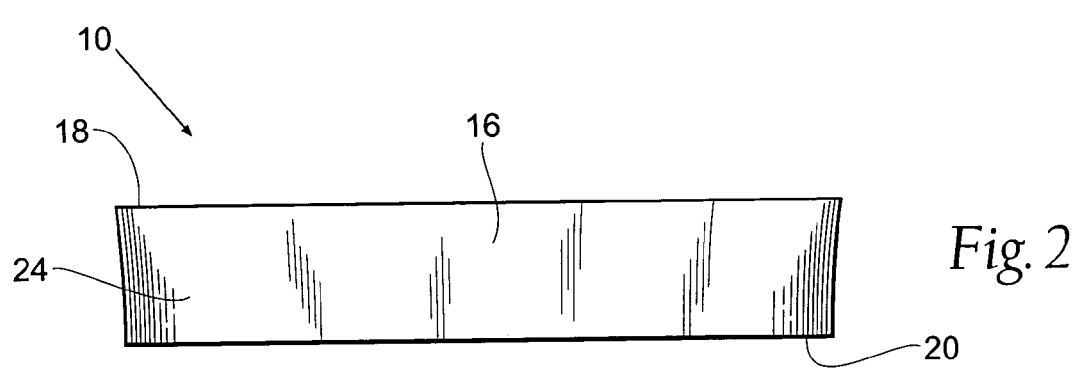
FIG. 2 is a side elevation view of the structure of FIG. 1.

FIG. 2 provides a side view of the adaptor 10. The outside surface 24 of the tube structure 16 tapers outwardly from the bottom end 20 to the top end 18. This is a significant improvement over prior art adaptor designs. Prior adaptors had annular structures that were cylindrical in shape with no taper. Because there was no taper on the annular structures, it was not easy to fit a pipe to the adaptor; either a gap would result between the pipe and the adaptor, or a great deal of force would be required to force the pipe over and onto the adaptor. The taper in the present annular structure 16 alleviates these problems. The top end 18 of the annular structure is outwardly spaced to allow insertion of the pipe member 14 into the adaptor 10 (see FIG. 1). However, the bottom end 20 is arranged to closely surround the pipe member 14, thereby providing a tight mating seal between the pipe member 14 and the gate valve 12, without requiring undue force and exertion on the part of the installer, as was necessary in prior art designs. This allows for a quicker and more efficient installation process than prior art designs.

Figure 3:
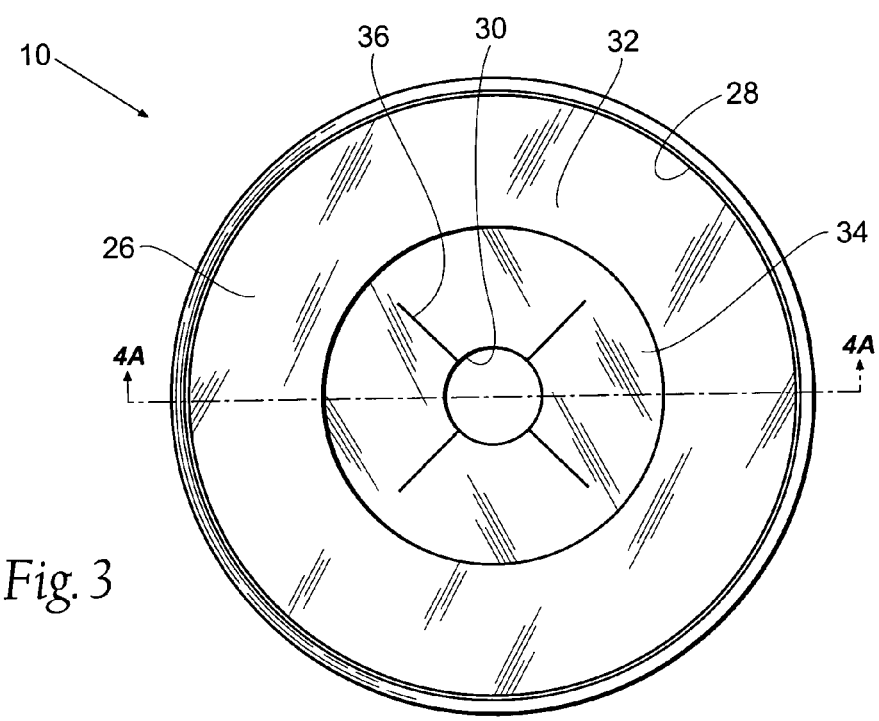
FIG. 3 is a top plan view of the structure of FIG. 1.

FIG. 3 provides an overhead view of the adaptor 10. As previously noted, the slits 36 located on the inner portion 34 of the flange 26 and that are projecting radially inwardly from the inner periphery 30 towards the tubular structure 16 are preferably symmetrically arranged and divide the inner portion 34 into four quadrants, which allows the flange 26 to easily flex around the gate valve 12 (see FIG. 1). The arrangement allows the flange 26 to further provide a tight sealing structure and minimize any liquid from leaking in and around the gate valve.

Figure 4A:
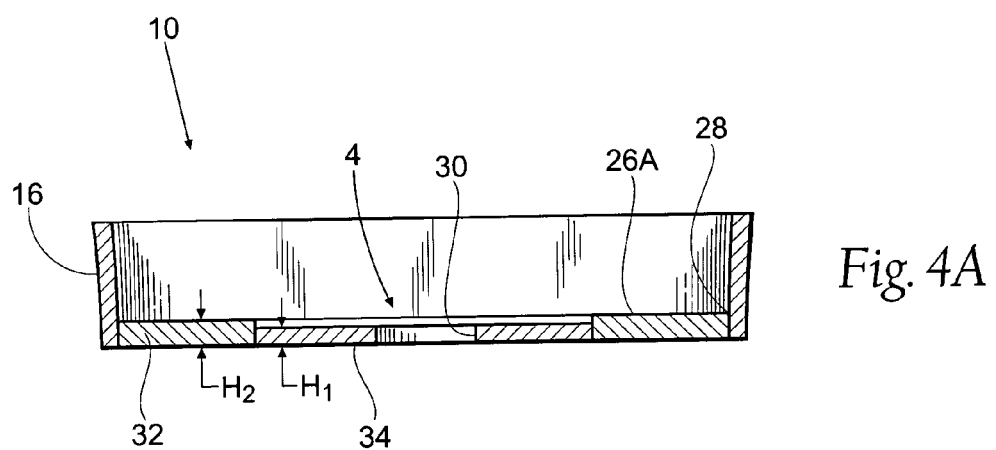
FIG. 4A is a cross-sectional view of the structure of FIG. 3 taken along line 4A-4A.

FIG. 4A shows a cross-sectional view of a stepped version on the flange 26 of the adaptor 10 taken along line 4A-4A of FIG. 3. The height $H_1$ of the inner portion 34 of the flange 26 is less than the height $H_2$ of the outer portion 32 of the flange 26. Compared to prior adaptors, the present design and arrangement of the flange 26 allows the adaptor 10 to be easily inserted over a gate valve and to conform to a gate valve, while still providing an ample supporting structure for the annular structure 16. That is, the inner portion 34 of the flange 26 is flexible enough to receive a gate valve and deform around the gate valve, while the outer portion 32 is sturdy enough so that the adaptor 10 will not unnecessarily deform when being secured on a gate valve, thereby providing an efficient sealing structure with an inserted pipe member. Furthermore, the flexibility of the inner portion 34 makes installation easier and safer by providing more room for the installer's hands to navigate around a gate valve. The adaptor thus combines ease of installation with a sturdy, resilient structure not previously realized by the prior art.

Figure 4B:
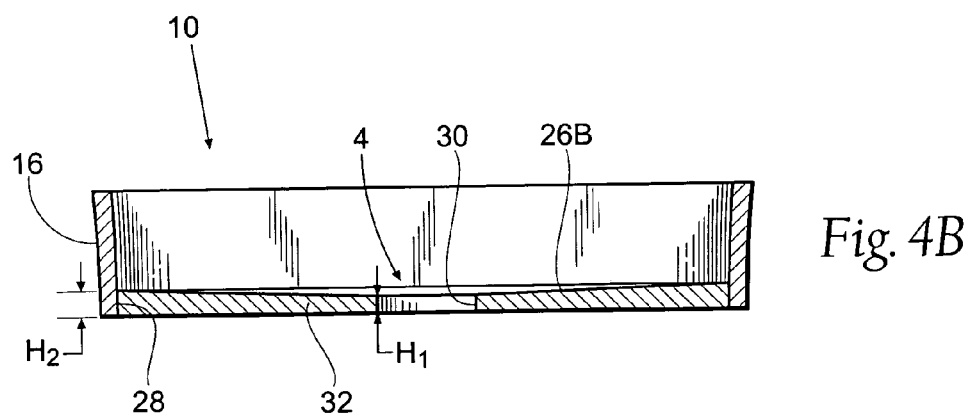
FIG. 4B is a cross-sectional view of a gate valve sealing structure as shown in FIG. 1 having an alternate flange arrangement.
Figure 5:
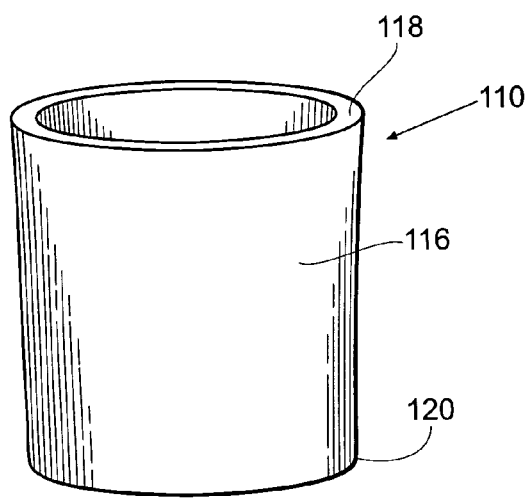
FIG. 5 is a perspective view of a second embodiment of a gate valve sealing structure according to the present invention.
Figure 6:
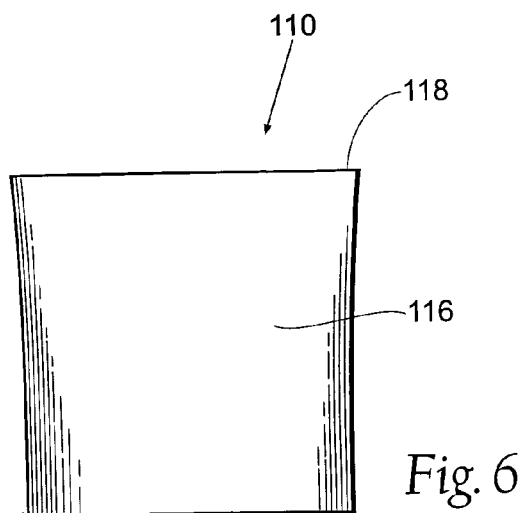
FIG. 6 is a side elevation view of the structure of FIG. 5.

The adaptor 10 is shown with the flange 26 having a stepped arrangement. The flange 26, however, does not have to be evenly stepped as shown. Provided that the flange 26 has a sufficient supporting height $H_2$ near the tube structure 16 and is of a sufficiently flexible height $H_1$ at the inner periphery 30, any inwardly tapering structure will fall within the scope of the present invention. As an example, FIG. 4B provides a cross-sectional view of the adaptor 10 having an alternative flange arrangement. The adaptor 10 is shown with an evenly tapered, smooth flange surface 26B in contrast to the stepped flange surface 26A of FIG. 4. The flange surface 26B tapers evenly from the tube structure 16 towards the inner periphery 30. At the tube structure, the height $H_2$ of the outer portion 32 of the flange 26a is the same as the height $H_2$ of the outer portion 32 of the flange 26 in FIG. 4. Similarly, the height $H_1$ at the inner periphery 30 is the same for both flange surfaces 26A and 26B. The flange of FIG. 4B provides the same advantages as discussed above with respect to the flange of FIG. 4A.

Figure 7:
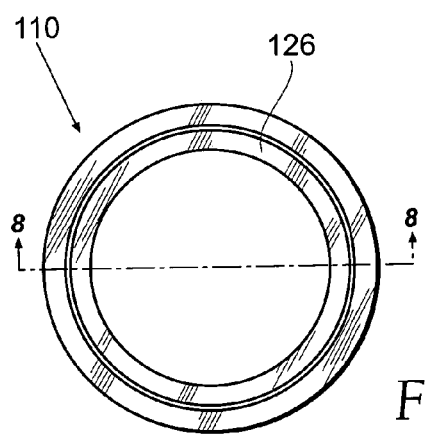
FIG. 7 is a top plan view of the structure of FIG. 5.
Figure 8:
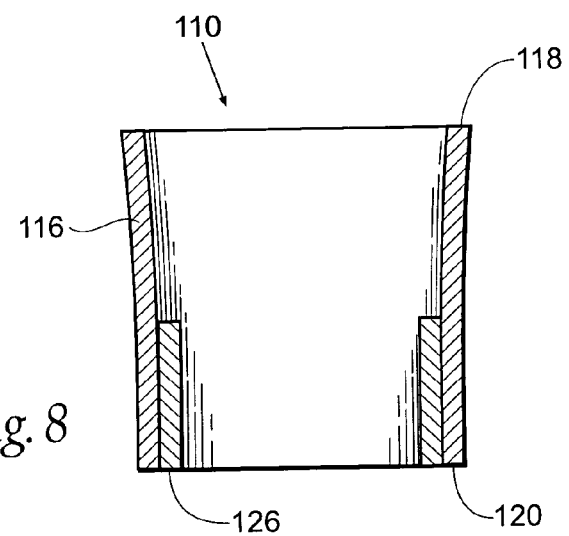
FIG. 8 is a cross-sectional view of the structure of FIG. 7 taken along line 8-8.
Figure 9:
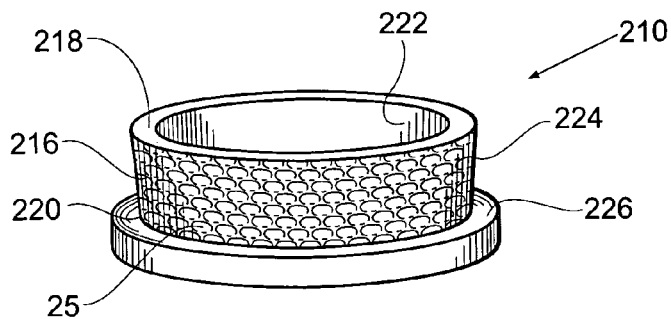
FIG. 9 is a perspective view of a third embodiment of a gate valve sealing structure according to the present invention.
Figure 10:
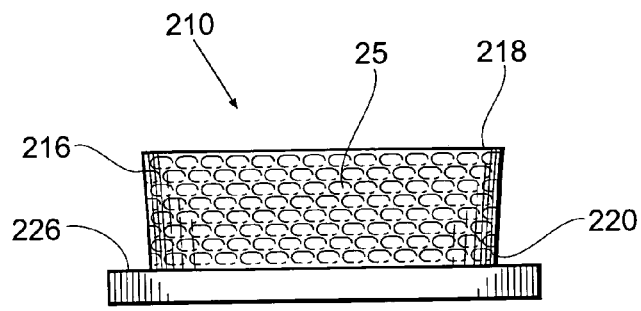
FIG. 10 is a side elevation view of the structure of FIG. 9.
Figure 11:
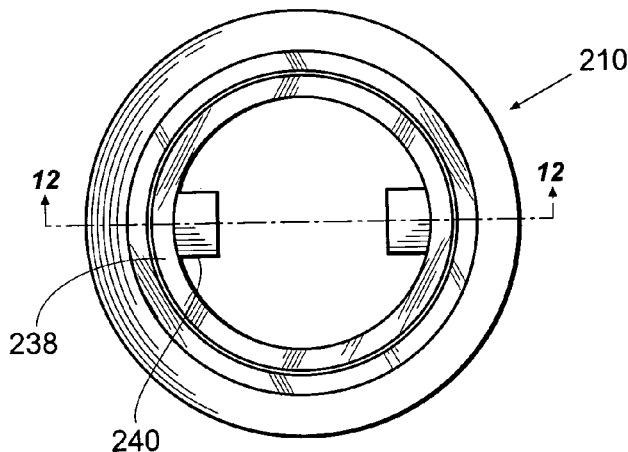
FIG. 11 is a top plan view of the structure of FIG. 9.
Figure 12:
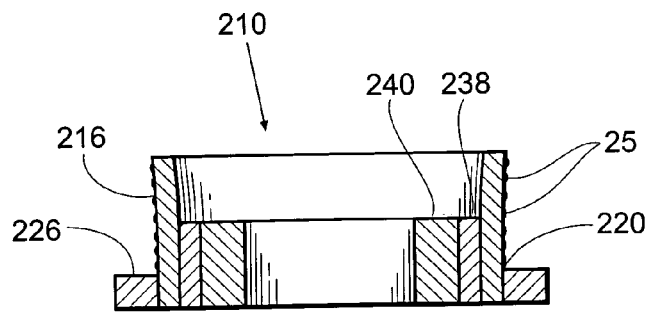
FIG. 12 is a cross-sectional view of the structure of FIG. 11 taken along line 12-12.
Figure 13:
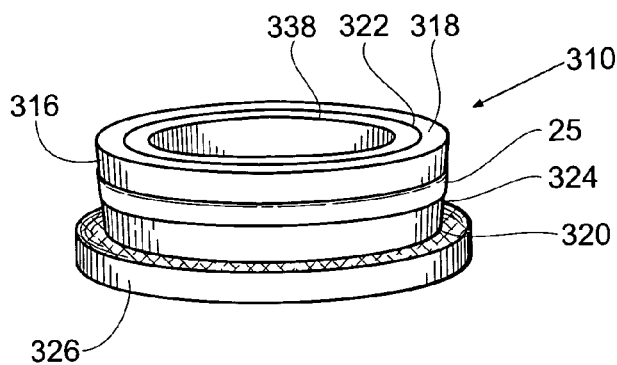
FIG. 13 is a perspective view of a fourth embodiment of a gate valve sealing structure according to the present invention.
Figure 14:
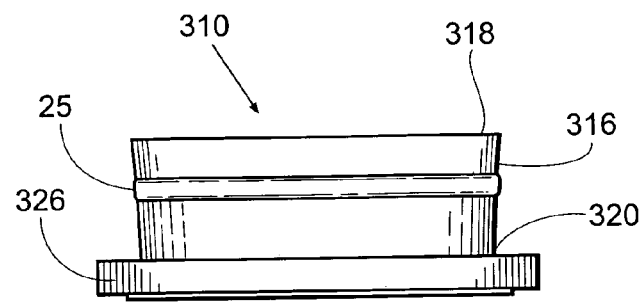
FIG. 14 is a side elevation view of the structure of FIG. 13.

FIGS. 5-8 show a second embodiment 110 of the present invention. The adaptor 110 has an annular structure 116 having a top end 118 and a bottom end 120. As with the adaptor 10, the annular structure 116 tapers outwardly from the bottom end 120 to the top end 118 to allow easy insertion of a pipe that will provide adequate sealing properties for a gate valve. FIGS. 7 and 8, in particular, show an arrangement of a flange 126 differing from the flange 26 shown on the adaptor 10. The flange 126 has a larger height than that of the flange 26 of FIG. 1. The difference in design of the flanges is determined by the dimensions of the gate valve with which the adaptor will be used. However, the tapered arrangement of the structure 116 provides a similarly advantageous mounting structure as that of the adaptor 10.

FIGS. 9-12 show another embodiment 210 of the present invention. The adaptor 210 has an annular tube structure 216 having a top end 218 and a bottom end 220, similar to the previously described embodiments. The annular tube structure 216 tapers outwardly from the bottom end 220 to the top end 218 to form the improved sealing structure as previously discussed. The tube structure 216 has an inside surface 222 and an outside surface 224. A flange 226 extends outwardly from the outside surface 222 proximal to the bottom end 220 of the tube structure 216. An inner flange 238 (see FIGS. 11 and 12) located at the inner surface 222 of the tube structure supports a pair of adaptor supports 240 that are formed of a solid material. The supports 240 are preferably of the same height as the inner flange 238 and may also be molded or formed as a single piece with the inner flange 238. Differing from previously described adaptor designs, the supports 240 and the inner flange 238 prevent the adaptor from overly deforming when placed over a gate valve, which improves the sealing capability of the adaptor 210. The solid supports 240 are preferably arranged on sides of the adaptor 210, but the arrangement could change depending upon which specific gate valve the adaptor 210 is positioned.

FIGS. 13-16 still show another embodiment 310 of the present invention. The adaptor 310 is similar to the arrangement of the adaptor 210 described in FIGS. 9-12, inclusive. The adaptor 310 has an annular tubular structure 316 having a top end 318 and a bottom end 320.

The adaptor 310 tapers outwardly from the bottom end 320 to the top end 318 to provide for ease of insertion of a pipe member as previously described for the other embodiments. The adaptor 310 has an inside surface 322 and an outside surface 324. A flange 316 extends outwardly of the outside surface 324 of the tube structure 316, proximal to the bottom end 320 of the tube structure 316. An inner flange 338 located at the inner surface 322 of the tube structure 316 provides support for the adaptor 310. The inner flange 338 is located proximal the top end 318 of the tube structure 316. The inner flange 338 could be placed at any vertical position along the inside surface 322 of the tube structure 316, but placement near the top of the structure 316 provides adequate support without the adaptor 310 being impeded when being placed upon a gate valve.

Figure 15:
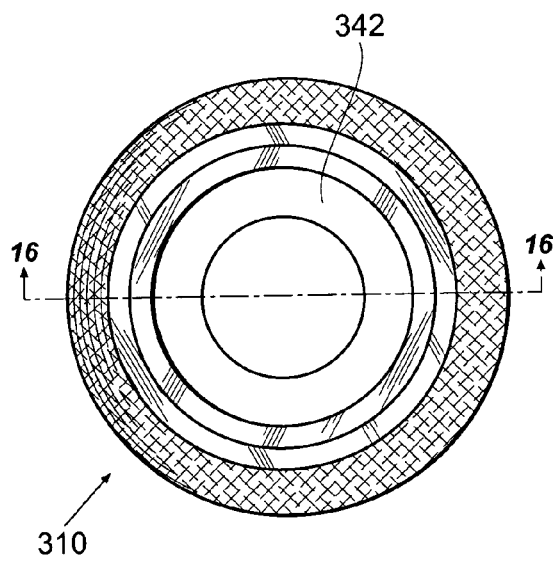
FIG. 15 is a top plan view of the structure of FIG. 13.
Figure 16:
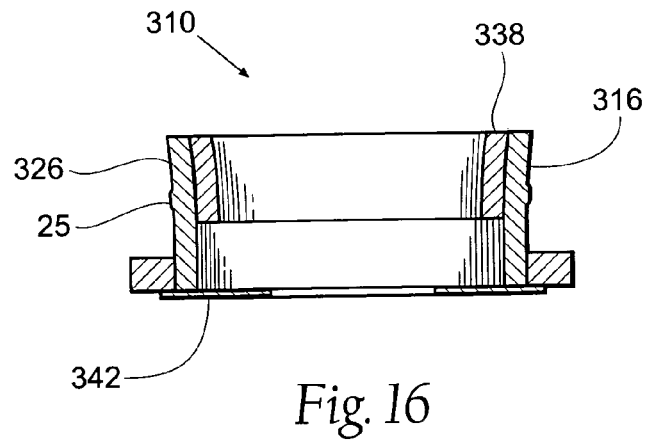
FIG. 16 is a cross-sectional view of the structure of FIG. 15 taken along line 16-16.
Figure 17:
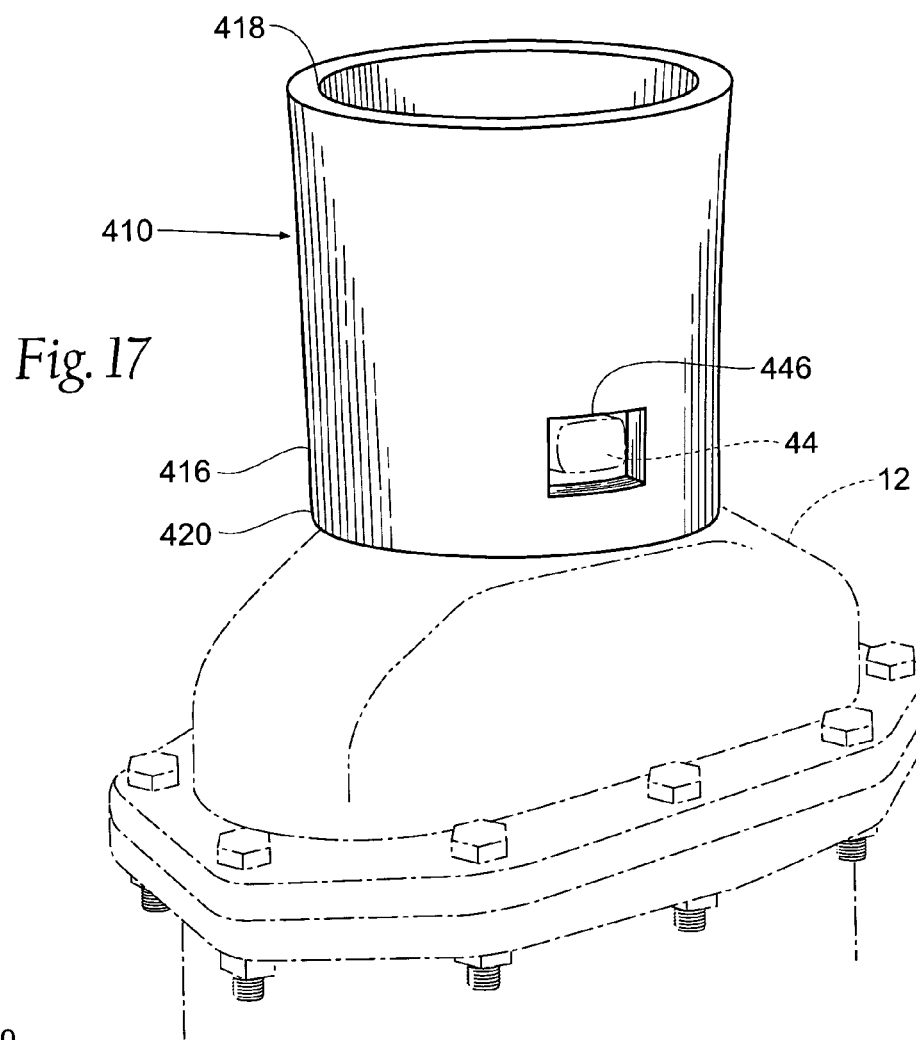
FIG. 17 is a perspective view of a fifth embodiment of a gate valve sealing structure according to the present invention.
Figure 18:
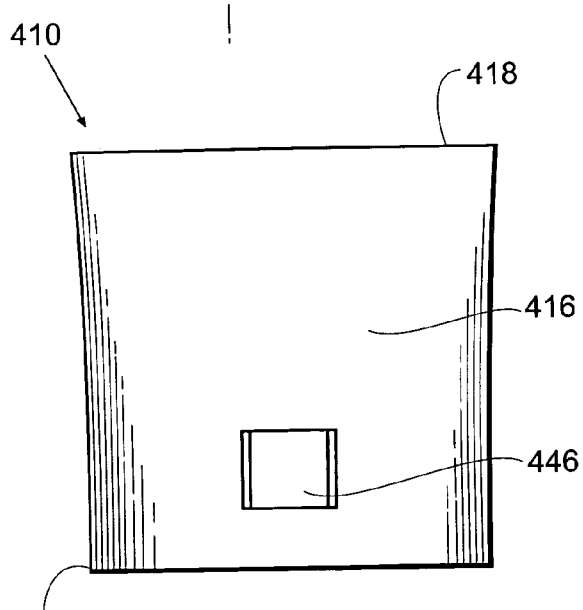
FIG. 18 is a side elevation view of the structure of FIG. 17.
Figure 19:
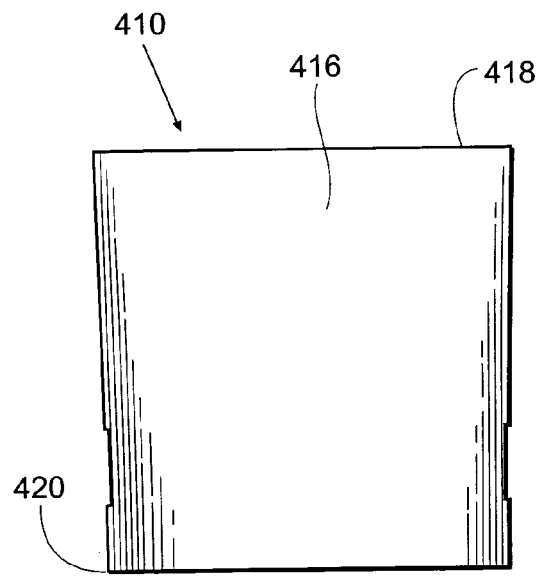
FIG. 19 is a top plan view of the structure of FIG. 17.
Figure 20:
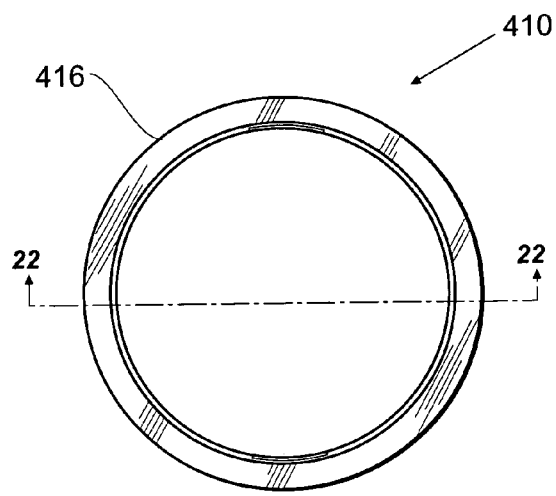
FIG. 20 is a top plan view of a sixth embodiment of a gate valve sealing structure according to the present invention.
Figure 21:
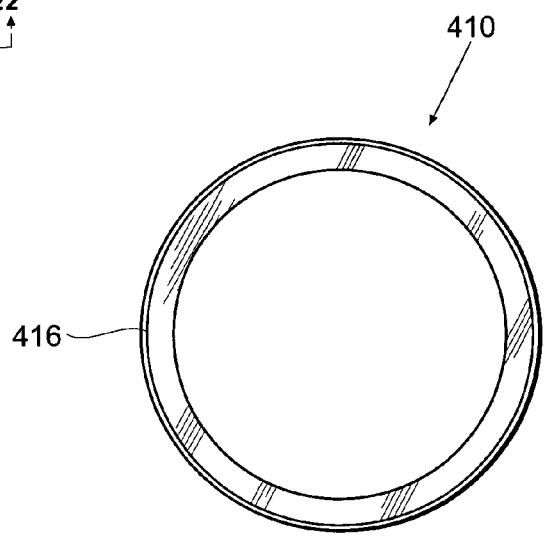
FIG. 21 is a second top plan view of the structure of FIG. 20.
Figure 22:
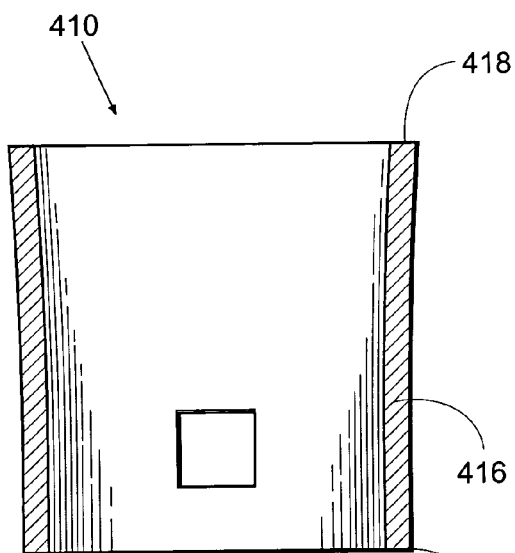
FIG. 22 is a cross-sectional view of the structure of FIG. 20 taken along line 22-22.

Still referring to FIGS. 13-16, and more specifically to FIGS. 15 and 16, a flexible membrane 342 is attached to the tubular structure 318. The flexible membrane 342 allows the adaptor 310 to be firmly and securely placed on a gate valve in an easier and efficient manner. The membrane 342 is made up of a stretchable material, such as a rubber or nylon material, that will conform to the dimensions of the specific gate valve that the adaptor 310 is arranged over. However, the inner flange 318 still provides overall structure for the adaptor 310, thereby preventing the adaptor 310 from overly deforming when placed upon a gate valve. The membrane 342 is preferably adhered to the underside of the flange 326, but any suitable compound or device may be used to connect the membrane 342 to the adaptor 310.

FIGS. 17-22 show a fifth embodiment 410 of the present invention. The adaptor 410 generally comprises an annular tube structure 416 having a top end 418 and a bottom end 420, with the tube structure 416 tapering outwardly from the bottom end 420 to the top end 418, as in the previous embodiments of the present invention. The adaptor 410 sits upon a gate valve 12 having outwardly extending protrusions 44. The outwardly extending protrusions 44 provide difficulty in properly fitting adaptors over a gate valve. The present adaptor 410 has a pair of cutouts or apertures 446 that are sized to fit over the outwardly extending protrusions 44, which allows the adaptor 410 to provide a solid fit as with the previous embodiments.

Figure 23:
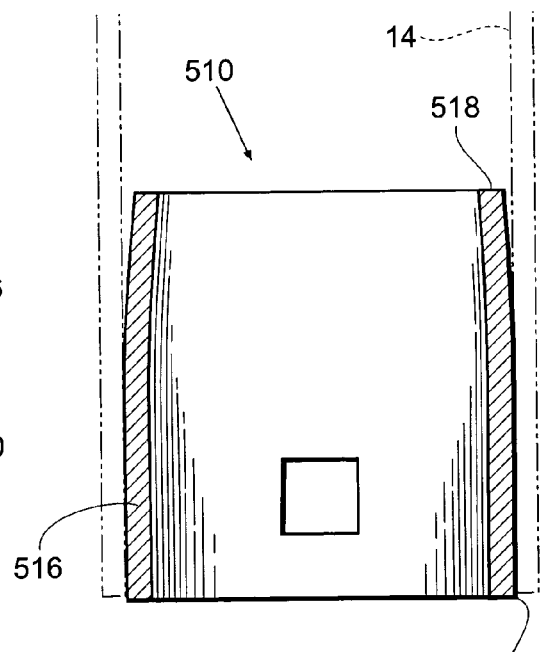
FIG. 23 is a side elevation view of a seventh embodiment of the present invention.
Figure 24:
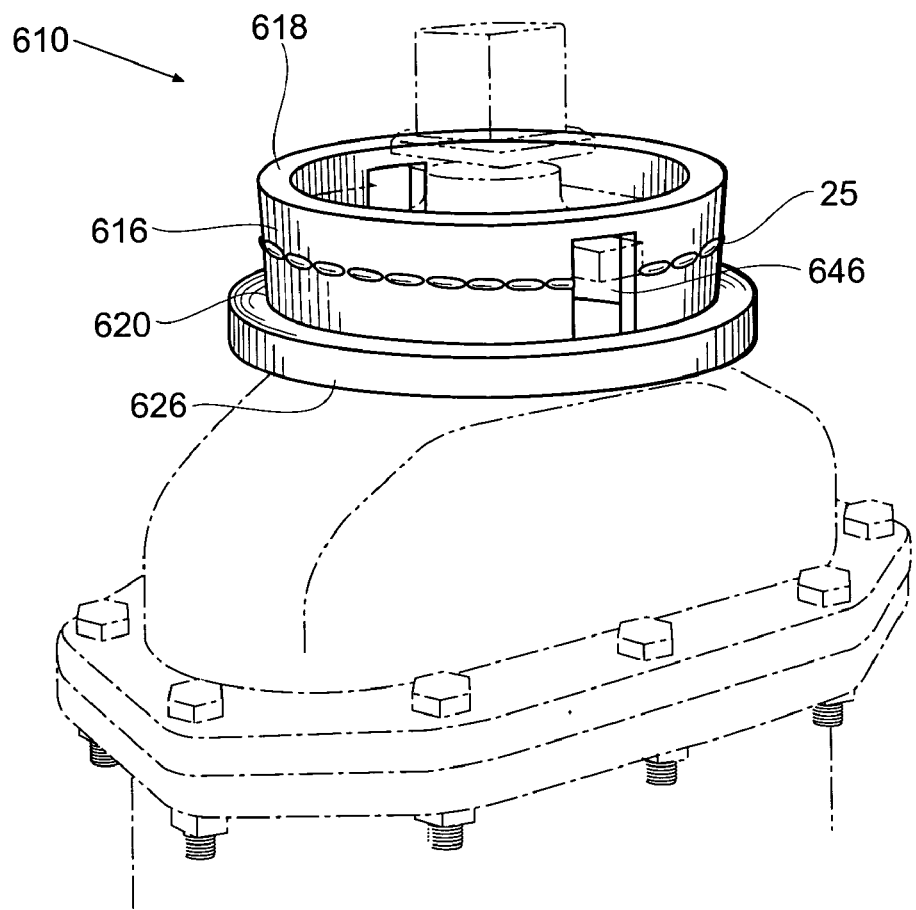
FIG. 24 is a perspective view of the sixth embodiment of the present invention.
Figure 25:
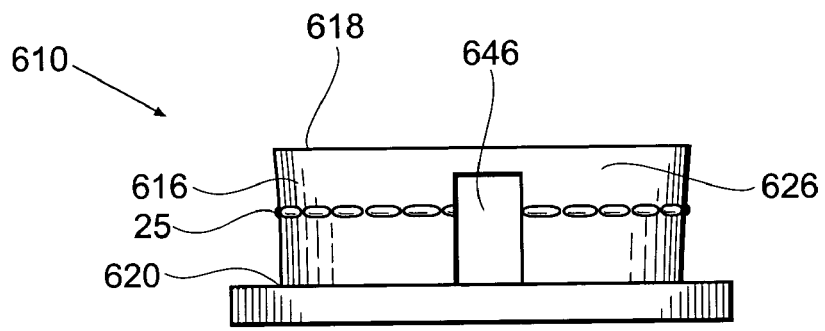
FIG. 25 is a side elevation view of the gate valve structure of the FIG. 24.
Figure 26:
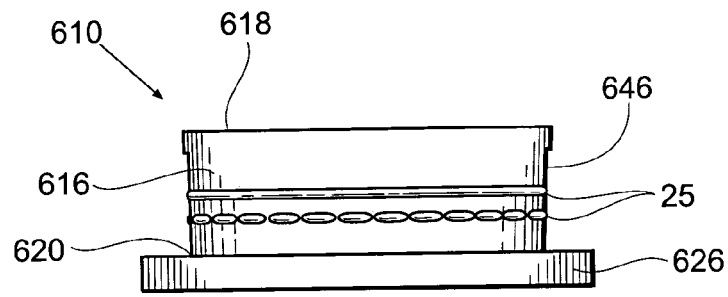
FIG. 26 is a second side elevation view of the gate valve structure of FIG. 24.
Figure 27:
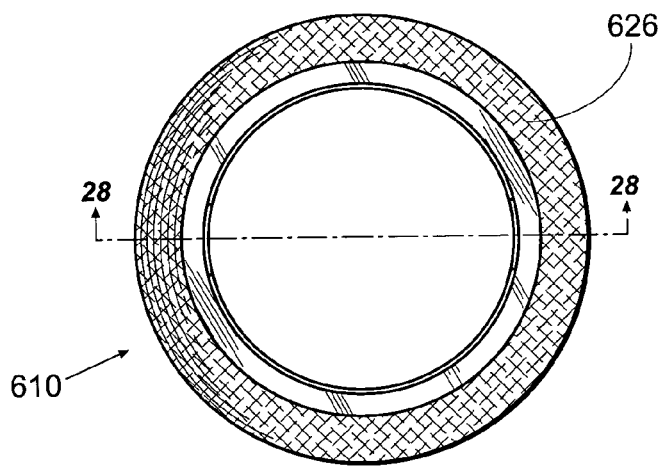
FIG. 27 is a top plan view of the gate valve structure of FIG. 24.
Figure 28:
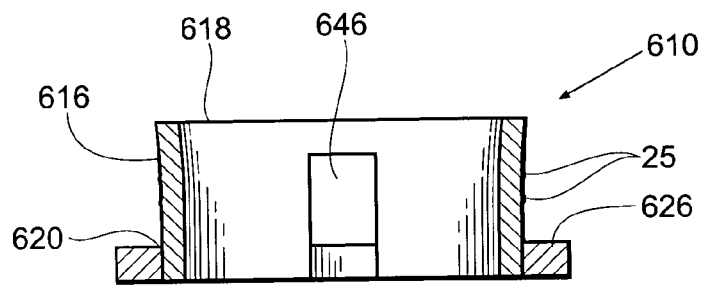
FIG. 28 is a cross-sectional view of the valve structure of FIG. 27 taken along line 28-28.

FIG. 23 depicts a sixth embodiment 510 of the present invention. The adaptor 510 is similar to the adaptor 410, having an annular tubular structure 516 that has a top end 518 and a bottom end 520. The difference between the adaptor 510 and the adaptor 410 is that the tubular structure 516 tapers inwardly from the bottom end 520 to the top end 518, as opposed to outwardly. This facilitates placement of a pipe over the tube structure 516. The principles of providing an adaptor that will provide a tight seal and allow easier placement of a pipe upon a gate valve as discussed with the previous embodiments also apply for the present embodiment. Thus, the adaptor 510 shows that, provided that the surface of an adaptor that mates with the attached pipe has a tapered arrangement to facilitate installment, an adaptor may have an inwardly or outwardly tapered arrangement and still fall within the scope of the present invention.

FIGS. 24-28 provides a seventh embodiment 610 of the present invention. The adaptor 610 has an annular tubular structure 616 that has a top end 618 and a bottom end 620, with the tube structure 616 tapering outwardly from the bottom end 620 towards the top end 618. The tubular structure has a pair of cutouts or apertures 646 that are designed to fit around the outwardly extending protrusions 44 of the gate valve 12.

The adaptor 610 is similar to the adaptor 410, except that the adaptor 610 has an outwardly extending flange 626 located at the bottom end 620 of the tubular structure 616. Because the cutouts 646 comprise a larger portion of the height of the tubular structure 616 than the cutouts or apertures 446 of the tubular structure 416 (see FIG. 17), the extending flange 626 provides added support so that the adaptor 610 does not overly deform when placed upon the gate valve 12.

As shown in several of the Figures (see, e.g. FIGS. 9-10, 12, 13, 14, and 24-27), the tapered surface of the adaptors has an additional bead or beads 25 integrated into the tapered surface. The beads 25 are a further improvement over the prior art. The beads 25, which can be of varying sizes as shown in the drawings, allow the adaptor to better grip the pipe as the pipe and adaptor are mated, which provides a tighter seal than a smooth surface. Thus, the present invention further improves the ability for the adaptors to be easily situated on a gate valve while providing a tight seal. It should be understood that the beads could be on either the inside or the outside surface of the tubular structure, depending on which surface is tapered, as previously discussed for mating purposes. Likewise, there could be a single circumferential horizontal bead 25 surrounding the upright section of the individual adaptor, a plurality of individual beads 25 forming a horizontal ring around the upright section, or a plurality of staggered beads 25 at various heights on the upright section. There could also be more than one ring of beads 25 located at varying heights on the upright section, with the ring comprising one bead or a plurality of beads 25. The beads 25 are preferably formed integrally with the upright section. Provided the beads 25 assist in providing a gripping structure that does not prevent mating of the adaptor with a pipe, the bead design will fall within the scope of the present invention.

The noted improvements of the present invention can be incorporated into an adaptor separately or in any of several combinations. For instance, the tapered tube structure, the tapered or stepped flange, and the tube structure having slots could all be found in a single adaptor, or they could each be an individual improvement of a single adaptor. By providing a tight sealing structure that is easier to install than the prior art, the present invention provides a more economical and efficient adaptor structure, for a wide range of gate valve assemblies. Not only is installation time reduced, but potential costs and time associated with injuries to the installer will also be reduced.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

I claim:

1. In a liquid infiltration adapting structure for adapting a pipe member to a valve assembly to thereby prevent liquid infiltration around said valve assembly, the liquid adapting structure comprising a generally annular flexible tube structure having a top end and a bottom end and an inside surface and an outside surface, one of said inside and outside surfaces providing a mating surface for receiving said pipe member, the improvement being:

said mating surface of said flexible tube structure tapering continuously and evenly in a constant direction from said bottom end towards said top end of said tube structure said tapering structure thereby forming a continuously curved structure to form a flared structure at said top end of said mating surface for receiving said pipe member, said bottom end of said mating surface providing a sealing arrangement for said pipe member.

2. The structure of claim 1 further comprising a flange extending relatively perpendicular from said annular tube structure.

3. The structure of claim 2 wherein said flange extends inwardly of said annular tube structure.

4. The structure of claim 3 wherein said inside surface comprises said mating surface, said mating surface tapering outwardly from said bottom end to said top end.

5. The structure of claim 2 wherein said flange extends outwardly of said annular tube structure.

6. The structure of claim 5 wherein said tapered surface comprises at least one bead.

7. The structure of claim 6 wherein said bead circumferentially horizontally surrounds said tapered surface.

8. The structure of claim 1 wherein said tapered surface comprises a ribbed surface.

9. The structure according to claim 1 further comprising at least one aperture located in said mating surface of said tubular structure, said aperture being arranged to receive an outward extending protrusion of said valve assembly.

10. The structure according to claim 9 further comprising two oppositely disposed apertures located in said mating surface of said tubular structure, each of said apertures being arrange to receive an outward extending protrusion of said valve assembly.

11. A liquid infiltration adapting structure according to claim 1 further comprising
a first flange extending relatively perpendicular from annular tube structure;
a second flange extending relatively perpendicular to said annular tube structure.

12. The structure according to claim 11, wherein said second flange extends inwardly from said annular tube structure, said structure further comprising a pair of oppositely disposed solid supports connected to said second flange.

13. The structure according to claim 12 wherein said second flange comprises a flexible membrane member.

14. The structure according to claim 13 further comprising a third flange, said third flange located near said top end of said annular structure.

15. The structure according to claim 1 wherein said mating surface further comprises a bottom section and a top section, said bottom section tapering evenly inwardly from said bottom end, said top section tapering evenly outwardly to said top end.

16. The structure according to claim 15 further comprising a bead located between said bottom section and said top section.

17. The structure according to claim 16 wherein said bead circumferentially surrounds said mating surface.

* * * * *